June 4, 1963   W. ESTER ETAL   3,092,557
PROCESS FOR THE PRODUCTION OF HIGHLY CONCENTRATED SOLUTIONS OF
PEROXIDES OF TERPENE HYDROCARBONS FROM DILUTE
SOLUTIONS OF SAME
Filed June 23, 1959
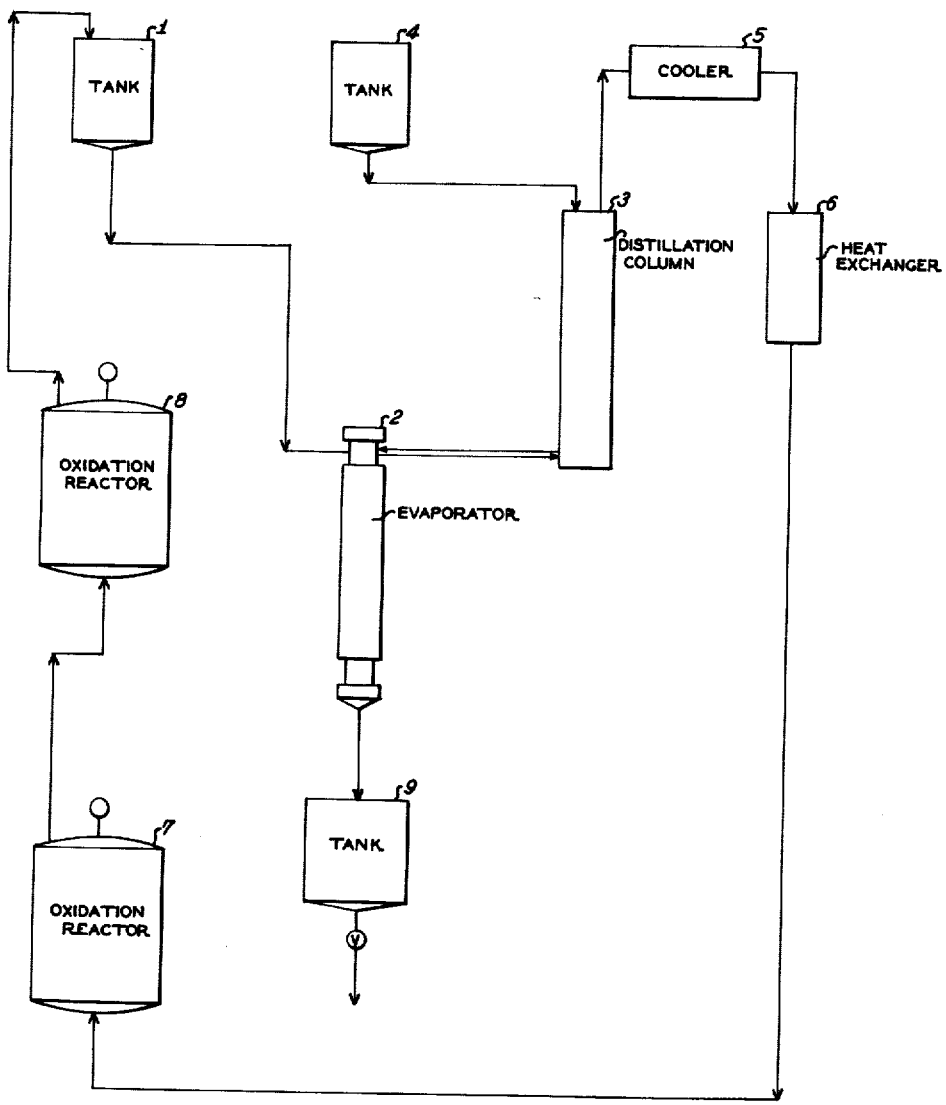
INVENTORS
WILHELM ESTER
AUGUST SOMMER
BY
ATTORNEYS

United States Patent Office 3,092,557
Patented June 4, 1963

3,092,557
PROCESS FOR THE PRODUCTION OF HIGHLY CONCENTRATED SOLUTIONS OF PEROXIDES OF TERPENE HYDROCARBONS FROM DILUTE SOLUTIONS OF SAME
Wilhelm Ester and August Sommer, Herne, Germany, assignors to Bergwerksgesellschaft Hibernia A.G., Herne, Germany, a German corporation
Filed June 23, 1959, Ser. No. 822,280
Claims priority, application Germany June 28, 1958
12 Claims. (Cl. 202—64)

This invention relates to hydroperoxides and to methods of preparation of same, in the form of concentrated solutions.

More specifically, this invention relates to methods of preparation of terpene hydroperoxides in high concentration.

In general it is well known that peroxides decompose very rapidly under the influence of heat. If one wishes to convert low-content peroxide solutions into solutions of higher content, one must carry out the operation under very carefully controlled conditions.

Several devices have been suggested to obtain solutions of higher peroxide content.

When the process used amounts to distillation of the solvent, some advantages are achieved by means of the so called thin-layer evaporators or film evaporators.

Thin-layer-evaporators have, for instance, already found application in the concentration of hydrogen peroxide solutions. However, considerable difficulties in the procedure occur with such apparatus. For instance, a very frequent and serious difficulty is that on the cylindrical surface where evaporation is supposed to occur, impurities inevitably accumulate. This accumulation, of course, may accelerate a decomposition of the peroxide. In order to obviate this difficulty, it has been suggested to effect a turbulent motion of the peroxide solution, as it drips down over the evaporation surface. This turbulent motion may be accomplished by rotation of the cylindrical surface and by a reverse motion effect of lengthwise-stretched leaves or vanes which brush against the cylinder wall.

The net result of carrying out the evaporation in this manner is that no substantial accumulation of impurities occurs, and no substantial decomposition of the peroxide is encountered. The process, however, is very uneconomical, because a part of the solution is removed in the same original dilution, and no concentration is achieved. Essentially, the process may be better characterized as a purification of the peroxide solution rather than concentration of the solution in peroxide content, because while one achieves a substantial purification, the increase in concentration achieved is practically negligible.

It has been suggested to add to the hydrogen peroxide solution, before it is allowed to reach the film evaporator, some volatile stabilization agents, with the object of forming a protective layer against future decomposition. However, this process has considerable disadvantages, as well, since even after a comparatively short time strong incrustations appear on the evaporator which interfere with a uniform heat transmission. By means of special cleaning measures it is possible to remove most of these incrustations, but this involves additional equipment and increase of manufacturing cost.

All the difficulties discussed so far for the concentration of peroxides, are present in the specific case of the terpene peroxides, at least to the same extent as with other peroxides, but usually they are even more serious. Generally, the oxidation process wherein terpenes are used is carried out with difficulty, and one cannot ordinarily obtain the peroxides except in a very dilute form.

For instance, p-menthane hydroperoxide is obtained in the form of a solution, containing at the most 7–15% of the peroxide. The same is true, for instance in the case of pinane-hydroperoxide. Many applications of these hydroperoxides, however, require the use of more concentrated solutions. For instance, when these terpene hydroperoxides are used as polymerization catalysts, it is almost essential to use solutions of higher concentrations. The difficulties discussed above in the concentration of other hydroperoxides are greater here, because the hydroperoxides of the terpene hydrocarbons are subject to decomposition to a very high extent.

Several experiments were carried out for the purpose of adapting thin-layer-evaporators to the preparation of more concentrated solutions, but they were unsuccessful. This was so, not only because decomposition had occurred, but also because almost in every instance, a considerable part of the hydroperoxide had been distilled over together with the hydrocarbon from the head of the column. The losses due to the high volatility of the hydroperoxides prohibited a feasible operational application of the process.

It is an object of this invention to provide a simple process, which allows an increase in concentration of terpene hydroperoxide solutions to be carried out free from difficulties present in the prior art, and in a manner suitable to large-scale operations.

Another object of the invention is to provide a process which is safe, and which does not give rise to the usual undesirable decomposition of the hydroperoxides. Another object of the invention is to provide a process which is free from the operational losses usually encountered in the prior art, and which is suitable for practical applications. These and still further objects will appear from the following description and examples.

It has been found in accordance with the invention that efficient hydroperoxide recovery in high concentration may be obtained from dilute hydrocarbon solutions thereof by the combination of the thin-layer-evaporation step with a distillation step. The process in accordance with the invention contemplates the distillation of the dilute hydroperoxide solution of a terpene hydrocarbon, for instance 7% p-menthane-hydroperoxide solution in p-menthane, in a thin-layer-evaporator of usual constructions, and rectification of the products which accumulate in the head of the thin-layer-evaporator in a distillation column connected with the thin-layer-evaporator.

The distillation column is of the usual construction and is provided with the usual installations, such as Raschig rings, bell bottoms, sieve bottoms, etc. To the head of the second column, i.e., the distillation column, is fed fresh terpene hydrocarbon, which may contain additional substances such as contaminations, in order to produce the necessary reflux and the total condensed material including said additional substances and any hydroperoxide carried over flows continuously from the distillation column back to the head of the thin-layer-evaporator. The product which distills over from the distillation column is pure terpene hydrocarbon. The reflux ratio may be so adjusted that the quantity of pure terpene hydrocarbon, for instance p-menthane, which distills off, corresponds precisely to the quantity which is required for the continuous smooth oxidation process of hydrocarbons, concurrently carried out. In accordance with experience, the reflux ratios lie approximately within the range of 0.07:1 to 0.030:1.

The process of the invention presents many substantial advantages. Consistently, one obtains hydroperoxide solutions of much higher concentration than by other devices and methods known in the art, for instance up to 50% solutions, and the process is practically unaccompanied by decomposition. No losses worth mentioning occur. Higher concentrations even up to 99% may also be obtained. The higher boiling materials, present in the hydrocarbons to be used for the oxidation step, may be advantageously removed from the hydrocarbons without the expense of additional energy.

These products are mostly higher-boiling materials which generally are either already present in terpenes, or are formed therein during the hydrogenation of the dipentene to p-menthane. These materials are mainly sesquiterpenes, diterpenes, polyterpenes, and their corresponding alcohols. The advantage of removing these higher-boiling materials from the distillation column prior to oxidation of the hydrocarbons is important because these impurities on account of their small quantity, can be separated from the terpene fraction ordinarily only with great difficulty and with considerable expense of energy. On the other hand, they interfere even in very small quantities, with the oxidation step. These foreign substances by being condensed from the distillation column and passed to the head of the thin-layer evaporator, however, may exert a stabilizing effect on the hydroperoxides produced and are desirable as stabilizing agents in the peroxide concentrates. The distilled product accumulating over the head of the second column in accordance with the process of the invention is, on the other hand, practically free from impurities and may be used quite advantageously for the oxidation step.

The residue drawn off with the highly concentrated hydroperoxides and which contains the impurities stemming from the fresh terpene hydrocarbon, is free from any deleterious effect on the subsequent applications of the hydroperoxides, e.g., on the use of the hydroperoxides as catalysts for polymerization processes. A special step for the removal of these substances is usually not necessary. As already mentioned, such products even have a very advantageous effect as stabilizing agents. It is of course possible, if desired, to remove the aforementioned impurities from the highly concentrated hydroperoxide solutions as well by suitable operations such as, for instance, by means of a thin-layer evaporator.

In the distillation in the thin-layer-evaporator in accordance with the invention, the temperatures used are within the range of about 50 to about 120° C. and the pressures within the range of about 5 to 50 torr.

The temperature and the pressure during the process are adjusted according to the boiling point of the hydrocarbon used. It is advantageous, although not necessary to operate in the second or distillation zone, at about the same temperature and pressure as in the first or thin-layer evaporator zone. A small temperature rise in the second zone may occur without seriously interfering with the process.

It is necessary however, to prevent the temperature from rising substantially above 120° C., in order to prevent decomposition of the hydroperoxide from its concentrated solutions.

The rate of addition of the hydroperoxide solution depends upon the dimensions of the apparatus and of the film evaporator. The initial concentration of the hydroperoxide solution may be between 3 and 50%, but it is preferred to use solutions of concentration between 5 and 20%.

The following examples are set forth for the purpose of illustrating the invention but is understood that the invention not to be limited thereto. The following examples may be more easily understood with reference to the accompanying drawing, which shows a flow sheet for an embodiment of a process in accordance with the invention.

*Example 1*

A p-menthane-hydroperoxide solution with a peroxide content of 17.0% flows from the container 1 to the thin-layer-evaporator 2. The rising p-menthane vapors, which still contain some peroxide, flow to the column 3 and into the cooler 5. From the container 4 flows constantly fresh p-menthane, which has been formed previously from the hydrogenation of dipentene, to the head of column 3. The fresh p-menthane contains higher boiling materials, which have a deleterious effect in the oxidation, but which however, are desirable as stabilizers in the peroxide concentrate. These products reach the thin-layer-evaporator 2 together with peroxide carried over with the vapors which pass to the column 3 and together with the peroxide of increased concentration accumulate into the storage container 9. The p-menthane condensed in the cooler 5, flows over the heat exchanger 6 to the reactors 7 and 8, in which it is oxidized. The oxidation product reaches again the container 1.

The p-menthane quantity used up in the process amounted in this example to 5 kilos/hour; 30 liters of diluted peroxide-solution were produced hourly and the concentration was increased on the thin-layer-evaporator. The used-up p-menthane was replaced by fresh p-menthane from container 4. This corresponds to a reflux ratio of 0.25:1, when the increase in concentration of the peroxide is carried out up to the commercial concentration of 50%. In the concentration increase in accordance with this process no loss of peroxide could be detected. The peroxide quantity charged in the diluted solution was completely recovered as concentrate without decomposition.

The temperature was maintained in the system at 110° C., and the pressure was about 5 torr. The evaporating surface of the film evaporator consisted of a tube of 80 mm. diameter and 3 meters length.

*Example 2*

The concentration of the α-pinane hydroperoxide was carried out substantially as shown in Example 1, from the thin-layer-evaporator 2.

The concentration of the solution here was 21.8%. The quantity of α-pinane used up in the process amounted in this example to 5.7 kg. per hour. About 30 liters of dilute hydroperoxide solution were produced hourly, and subjected to concentration on the thin-layer-evaporator. The pinane hydroperoxide was concentrated to a concentration of 99%, and the α-pinane used up was replaced with fresh pinane from container 4. The reflux ratio was 0.23:1. No loss of peroxide could be detected. The concentrate was very stable.

*Example 3*

Limonene hydroperoxide of 8–10% was concentrated from a thin-layer-evaporator as in the preceding examples. The quantity of limonene used up in the process was 5.6 kg. per hour. The concentration achieved was up to 70% with a reflux ratio of 0.30:1. The product was quite stable. No loss of peroxide was detected during the process.

*Example 4*

The process of Example 1 was similarly applied to caranhydroperoxide of 8–10%. Here the quantity of carane used up hourly was 5.7 kg. A concentration of 80% was achieved with a reflux ratio of 0.23:1. The product was quite stable. No loss of peroxide was detected.

We claim:

1. A process for the concentration of terpene hydroperoxide solutions in a hydrocarbon solvent in which the solvent is the corresponding terpene hydrocarbon having higher vapor pressure than said hydroperoxide, which comprises the steps of passing a film of said hydroperoxide solution through a first zone at a temperature and pressure sufficient to vaporize at least a portion of said solvent, passing the vapors from said first zone to a second zone, feeding fresh hydrocarbon solvent into said second zone corresponding in composition to the terpene hydrocarbon originally used as solvent, maintaining said second zone at a temperature and pressure that the substantially pure terpene hydrocarbon is vaporized, recovering said substantially pure terpene hydrocarbon from said second zone, while returning any hydroperoxide carried over with said vapors to said second zone back to said first zone, and recovering the hydroperoxide-enriched hydrocarbon from said first zone.

2. Process according to claim 1, in which the hydrocarbon solvent fed to the second zone additionally contains substances of boiling point higher than said hydrocarbon solvent, whereby the recovery of the substantially pure hydrocarbon from said second zone, the return of the higher-boiling substances and of the hydroperoxide-enriched hydrocarbon to said first zone, and their removal therefrom, are facilitated.

3. Process according to claim 2 in which the hydrocarbon solvent fed to the second zone is passed into contact with the pure terpene hydrocarbon being vaporized therein to cause a portion of the vaporized pure hydrocarbon to condense within said second zone upon contact therewith, the reflux ratio of hydrocarbon solvent from the second zone to the first zone being maintained in the range of 0.07:1 to 0.30:1, and the hydroperoxide content in the final concentrate being at least 50%.

4. Process according to claim 1 in which the terpene hydrocarbon solvent fed to said second zone additionally contains at least one substance, which is a member selected from the group consisting of sesquiterpenes, diterpenes, polyterpenes, and their corresponding alcohols, said substance being of higher boiling point than the terpene hydrocarbon solvent, whereby the removal of the essentially pure hydrocarbon from second zone, the return of the higher boiling residue and of the hydroperoxide-enriched hydrocarbon to said first zone and their removal therefrom, are facilitated.

5. Process according to claim 4 in which the terpene hydroperoxide is p-menthane hydroperoxide, the second zone is a distilling column, and p-menthane, additionally containing at least one higher-boiling substance is fed to said distilling column.

6. Process according to claim 1 in which the hydrocarbon solvent fed to the second zone is passed into contact with the pure terpene hydrocarbon being vaporized therein to cause a portion of the vaporized pure hydrocarbon to condense within said second zone upon contact therewith, the reflux ratio of hydrocarbon solvent from the second zone to the first zone being maintained in the range of 0.07:1 to 0.30:1, and the hydroperoxide content in the final concentrate being at least 50%.

7. Process according to claim 4 in which the hydrocarbon solvent fed to the second zone is passed into contact with the pure terpene hydocarbon being vaporized therein to cause a portion of the vaporized pure hydrocarbon to condense within said second zone upon contact therewith, the reflux ratio of hydrocarbon solvent from the second zone to the first zone being maintained in the range of 0.07:1 to 0.30:1, and the hydroperoxide content in the final concentrate being at least 50%.

8. The process for the concentration of p-menthane hydroperoxide solutions, according to claim 5, in which said concentration is continuously carried out by continuously feeding p-menthane to the head of a distilling column, acting as said second zone, maintaining a reflux ratio of hydrocarbon solvent from said column to the first zone of 0.25:1, continuously withdrawing essentially pure p-menthane suitable for hydroperoxide oxidation from said column, while removing p-methane hydroperoxide-enriched solution, of about 50% hydroperoxide content, from a thin layer evaporator, acting as said first zone.

9. A process for the concentration of dilute p-menthane hydroperoxide obtained by the oxidation of p-menthane which comprises distilling in a thin-layer evaporator zone low-content p-menthane hydroperoxide solution obtained from the oxidation reactor zone, passing the vapors evolved to a distilling column connected with said evaporator zone maintained such that pure p-menthane is vaporized in the column, feeding to the head of said column fresh p-menthane containing at least one higher-boiling substance which is a member selected from the group consisting of diterpenes, sesquiterpenes, polyenes and their corresponding alcohols, adjusting the reflux ratio of hydrocarbon solvent from said distilling column to the evaporator zone in the range of 0.25:1, removing pure p-menthane from said column, passing said pure p-menthane to the oxidation reactor zone, while returning hydroperoxide carried over with said vapors to said second zone back to said first zone with said higher-boiling substance, and recovering the hydroperoxide-enriched p-menthane solution, of about 50% p-menthane hydroperoxide content and said higher-boiling substance from said thin-layer evaporator.

10. The process of claim 1 in which in both said zones the temperature lies in the range of 50° to 120° C. and the pressure is between 5 and 50 torr.

11. Process according to claim 4 in which the terpene hydroperoxide, is α-pinane hydroperoxide, the second zone is a distilling column, and α-pinane is fed to said distilling column.

12. Process according to claim 4 in which the terpene hydroperoxide is limonene hydroperoxide, the second zone is a distilling column and limonene is fed to said distilling column.

References Cited in the file of this patent

UNITED STATES PATENTS

| | | |
|---|---|---|
| 2,520,870 | Wood et al. | Aug. 29, 1950 |
| 2,605,290 | Robertson et al. | July 29, 1952 |
| 2,863,882 | Bain et al. | Dec. 9, 1958 |
| 2,895,886 | Schneider | July 21, 1959 |

UNITED STATES PATENT OFFICE
CERTIFICATE OF CORRECTION

Patent No. 3,092,557            June 4, 1963

Wilhelm Ester et al.

It is hereby certified that error appears in the above numbered patent requiring correction and that the said Letters Patent should read as corrected below.

Column 2, line 64, for "0.030:1" read -- 0.30:1 --; column 6, line 9, for "p-methane" read -- p-menthane --.

Signed and sealed this 21st day of January 1964.

(SEAL)
Attest:
ERNEST W. SWIDER

EDWIN L. REYNOLDS

Attesting Officer           Acting Commissioner of Patents